June 17, 1924.

J. C. BERTSCH 1,498,069

PROCESS OF RECOVERING VOLATILE FLUIDS

Filed Oct. 23, 1917   2 Sheets-Sheet 1

Inventor
John C. Bertsch.

June 17, 1924. 1,498,069
J. C. BERTSCH
PROCESS OF RECOVERING VOLATILE FLUIDS
Filed Oct. 23, 1917   2 Sheets-Sheet 2

INVENTOR.

Patented June 17, 1924.

1,498,069

UNITED STATES PATENT OFFICE.

JOHN C. BERTSCH, OF TULSA, OKLAHOMA, ASSIGNOR TO THE BERTSCH PROCESS COMPANY, OF WILMINGTON, DELAWARE, A CORPORATION OF DELAWARE.

PROCESS OF RECOVERING VOLATILE FLUIDS.

Application filed October 23, 1917. Serial No. 198,171.

*To all whom it may concern:*

Be it known that I, JOHN C. BERTSCH, a citizen of the United States, residing at Tulsa, in the county of Tulsa and State of Oklahoma, have invented certain new and useful Improvements in Processes of Recovering Volatile Fluids, of which the following is a specification.

This invention relates to the recovery of volatile fluids from fluent substances, and more particularly to the recovery of the more volatile oils and vapors contained in the products of wells, &c.

This invention consists of subjecting a fluent substance containing volatile fluids to a partial vacuum, that is, to a pressure below that of the atmosphere, for the purpose of liberating the more volatile matter by vaporization, and aspirating the vapor or gas so formed either by mechanical means or by absorbing the same in a suitable liquid. This invention consists of other features hereinafter described and more particularly pointed out in claim.

The primary object of this invention is to provide for the recovery of the more volatile substances contained in the products of oil wells and wells producing both oil and gas.

Another object of this invention is the recovery of the gases and vapors escaping from volatile oils, such as gasoline, benzol and the like, while they are stored or transferred from storage tanks into smaller containers.

These and other objects, which will be made apparent throughout the further description of this invention, are attained by the methods and means herein described and illustrated in the accompanying drawings forming a part hereof.

Under present practices incident to the production, storage and transfer of more or less volatile substances, a large amount escapes to the atmosphere, whereby much valuable material is wasted.

The method of recovering volatile fluids from fluent material, to which this invention is directed, may be utilized in connection with oil wells which produce so-called natural gas besides oil, without regard to whether such wells are flowing or pumped.

This invention may also be utilized in the recovery of the volatile products given off by light oils in storage, such as the distillates of petroleum, also the gas or vapor separated from the products of the destructive distillation of wood and coal. Or the invention may be utilized for recovering the gases and vapors from volatile oils during their transfer from large storage tanks into smaller containers, for the purpose of preventing waste as well as fire risks. It is common practice to discharge the product of oil wells, whether flowing or pumping wells, into large open tanks, also to store volatile oils, such as gasoline, benzol, turpentine and the like, in vented tanks, transferring them into shipping barrels through open connections and funnels. In this process, particularly during warm weather, much of the volatile matter escapes as waste. By the present invention this waste is obviated to the extent of recovering practically all of the more volatile substances at a relatively small expense, besides eliminating all danger of explosions and fire risks.

It has been proposed to absorb in kerosene or naphtha, and at atmospheric pressure, the vapors contained in natural gas, and also the gas or vapor escaping from the oil of oil- and gas-producing wells. But this process has the disadvantage that the absorbent must be brought to and removed from the oil- and gas-producing wells in quantities, which in most cases is impracticable if not entirely impossible, owing to the isolated location of the wells in hilly territories. Furthermore, in this older method, the gas must be under a sufficient pressure to flow through the absorbent in a series of vessels. But such a pressure very seldom exists, as at present the gas is pumped from most wells under a partial vacuum, so that this older absorption method cannot be employed.

In the drawings: Fig. 1 is a diagram of a typical pumping oil-well combined with a casing-head pumping arrangement for gas, to which my invention is applied for the recovery of volatile fluids by mechanical means.

Figure 1:
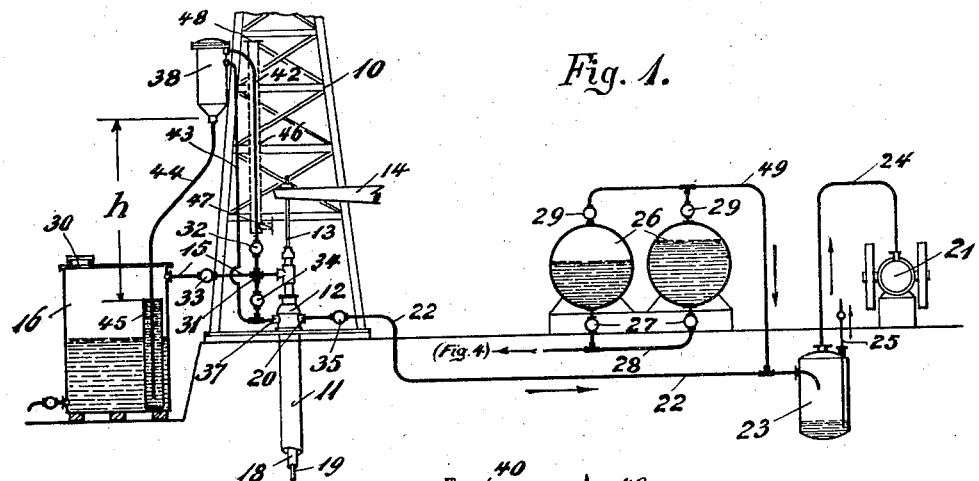
Figure 2:
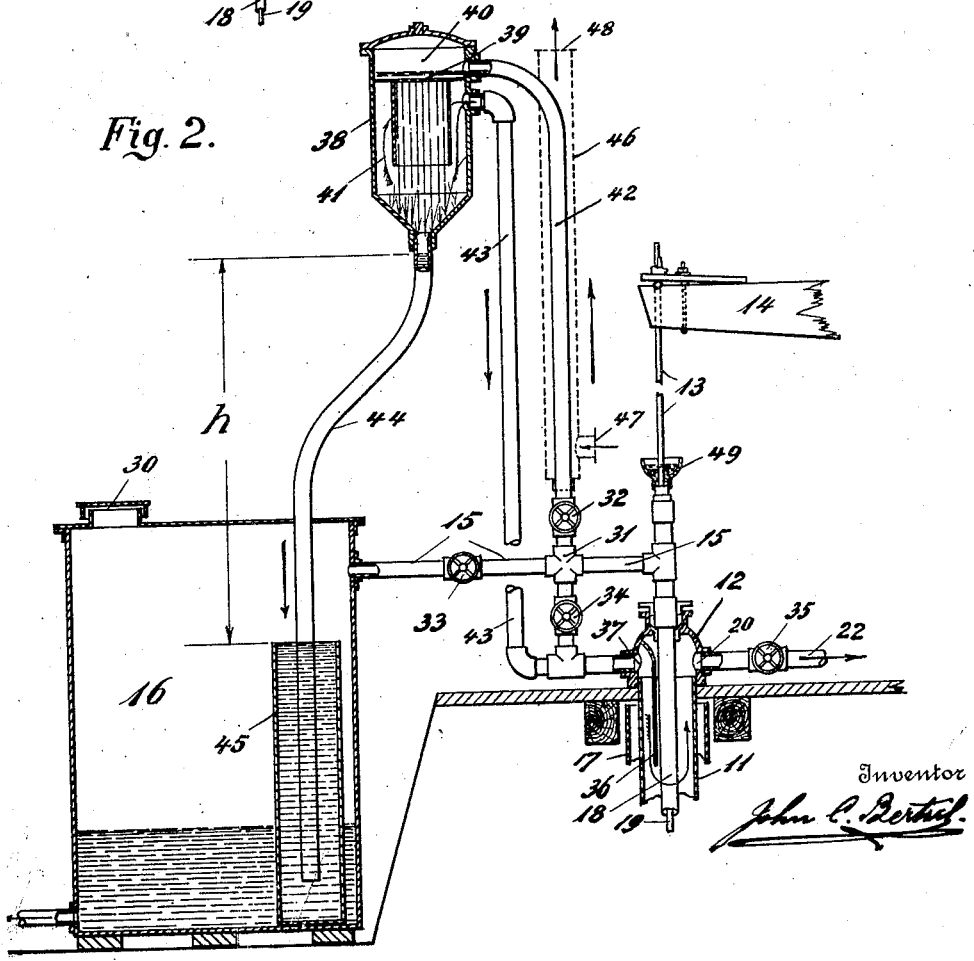
Fig. 2 is a view, part in section and part in elevation, of a pumping oil-well with oil tank, showing the typical equipment required for carrying out my invention in connection with crude oil.
Figure 3:
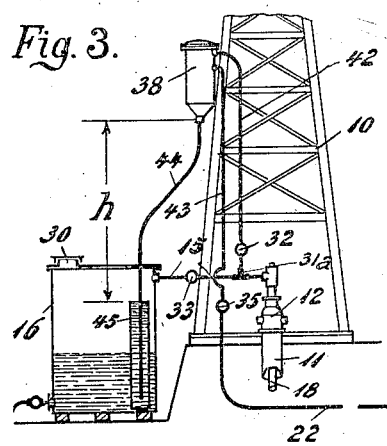
Fig. 3 is a diagram of a typical flowing oil-well embodying my invention.

The ordinary equipment of pumping oil-wells is shown by Fig. 1 and consists of a derrick 10, a well casing 11, a casing head 12, a pump rod 13, a walking beam 14, and an oil discharge pipe 15 leading into an oil tank 16. As shown in Fig. 2, the casing 11 is surrounded by a dry pipe 17 and contains the oil tubing 18, within which the oil pump is operated by pump rods 19. The typical arrangement of a flowing well, as shown by Fig. 3, is the same as for a pumping well, except that the entire pumping outfit is left off.

Many oil wells yield also gas which fills the space between the casing 11 and oil tubing 18, and which is collected through an opening 20 in the casing head, from which the gas derives the name "casing-head gas." As the pressure which causes a natural flow of gas soon dies away, the gas is pumped from the wells, which also increases the flow of oil, as the pressure within the casing is reduced to one much below that of the atmosphere. This pumping is commonly accomplished by a vacuum pump 21, one pump being used for a number of wells which are connected to one system by pipes 22, leading into a collecting tank 23 for the separation of the moisture or other liquid carried from wells. Tank 23 is connected with vacuum pump 21 by suction pipe 24, and the liquid separated out of the gas within tank 23 is blown out by gas or air under pressure through a valved pipe 25. The oil-wells are usually scattered over a large area several hundred feet or yards apart, and the pump 21 with collecting tank 23 and storage tanks 26 form a central station which is from hundreds of yards to several miles removed from said wells and connected with them only by a system of pipes 22.

Figure 4:
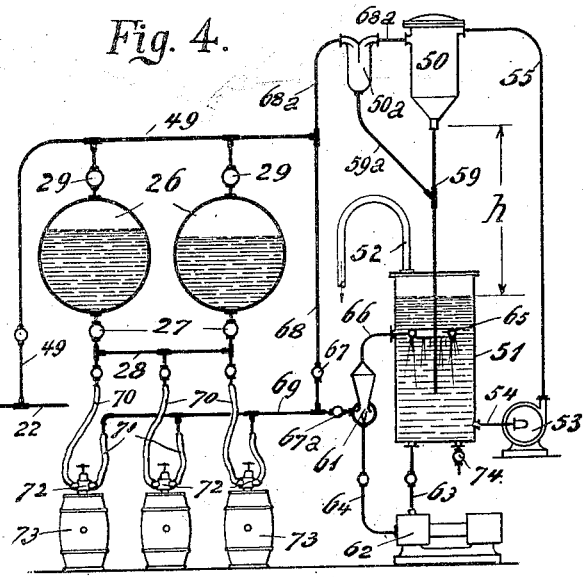
Fig. 4 is a diagrammatical view, and in part a section, of a gasoline refilling station, showing the application of my invention for the recovery of volatile fluids by mechanical means and absorption combined.

The gas thus pumped from the wells at pressures as low as 1 to 3 pounds absolute is compressed by pump 21 to about atmospheric pressure, at which it enters multi-stage compressors (not shown on drawings) to be compressed to pressures suitable for the extraction of gasoline and subsequent delivery of the gas into the trunk lines leading to distant cities. The gasoline extracted from the gas is accumulated and stored in tanks 26, from which it is lead through valves 27 and pipes 28 to re-filling stations as shown in Fig. 4, where it is put into shipping barrels or other smaller containers.

Tanks 26 are also provided with safety valves 29 for relief to the atmosphere of any gas or vapor at a pressure higher than the predetermined pressure.

The crude oil either pumped or blowing from wells is discharged into a tank 16 through pipe 15, and to prevent the bursting of tank 16 by the gas or vapor carried by the oil, tank 16 is provided with a vent 30, through which any pressure-forming gas or vapor can escape in the atmosphere. The apparatus as well as the methods so far described constitute the typical arrangement commonly used for the production of crude oil, natural gas and gasoline extracted from the latter. It is evident that much of the most valuable volatile substances is lost or wasted through vent opening 30 and safety valves 29, as well as during refilling into smaller containers.

To prevent all of this waste is the main object of my invention, for the application of which certain additions are required as will be presently described.

While experimenting with gasoline and mixtures of same with oil, I have discovered that the evaporation of the more volatile substances is very slow when the fluent material containing such volatile substances is kept in bulk at atmospheric or even at a greatly reduced pressure, whereas it is very rapid if the fluent material is broken up in a fine spray, and as such, is subjected to a partial vacuum. I have further discovered that a fluid vapor is absorbed much more quickly and in larger quantities when passed through a spray of absorbent liquid instead of being allowed to bubble up through a pool of the latter.

With this invention I make use of these discoveries by breaking into a fine spray the oil pumped from a well, right at the latter and before it is exposed to the atmosphere and also before it enters the storage tank, and subjecting the spray to the partial vacuum existing in the gas pumping system shown in Figs. 1 and 2. Said vacuum being not produced at the well, but at the distantly located central pumping station. To this end the oil discharge pipe 15 is branched off by a cross 31 (Fig. 1) or by a T 31ª as shown by Fig. 3 and stop valves 32, 33 and 34, the gas pipe 22 being provided with a stop valve 35. The casing head is provided internally with a baffle plate 36 or other means for deflecting downwards any substance entering through opening 37, which is connected with the branch controlled by valve 34. A barometric evaporator 38, supported by derrick 10, is placed at such an elevation that a column of oil of the height —h— equals in pressure the partial vacuum carried in pipe 22. The evaporator 38 is divided by a perforated plate 39 into an oil space 40 and a vapor space 41, of which the former is connected with valve 32 by an oil pipe 42, and the latter with opening 37 in casing head 12 by a vapor pipe 43, the bottom being provided with a tail pipe 44 which terminates near the bottom of a receptacle 45 within tank 16, as shown by Figs. 1, 2 and 3, but which may also be located outside of tank 16 at any convenient place.

To facilitate the separation of the gaseous substances from the oil, pipe 42 may be provided with a jacket 46, having an inlet 47 and an outlet 48, through which pass the exhaust gases from the engine driving the well pump (not shown on drawing) for the purpose of warming up the oil. Jacket 46 may consist of any suitable shape and material, as its purpose is only to form around pipe 42 a space which is filled with a relatively hot substance as heating medium, the latter entering at one end of said space, as for instance through opening 47, and after passing within said space and past pipe 42 heats the contents of the latter and leaves said space at the other end of the same, as for instance at the top 48 of jacket 46. The stuffing box of pump rod 13 is provided with an oil seal 49 for preventing air leakage into the pump.

For intermittent operation, valves 32 and 33 are closed, while valves 34 and 35 are open. The oil pumped from the well passes through cross 31, valve 34 and opening 37 into the gas carrying space of the casing 11, in which it is deflected downwards by the baffle plate 36. Falling to the bottom of the well through a distance of from 1000 to over 2000 feet, the oil is broken up into a fine mist, and, being exposed to the partial vacuum existing within the casing, gives up most of its gas or vapor contents, the latter being aspirated through pipe 22 by the action of vacuum pump 21. After a certain time valve 34 is closed and 33 opened, allowing the oil substantially free from gas or vapor to flow into tank 16 through pipe 15. However, such an intermittent operation may be suitable only for some wells, whereas for other wells a continuous operation may be necessary, in which case the deflecting means 36 may be omitted, valves 33 and 34 are closed and 32 and 35 opened. The oil pumped from the well passes now through pipe 42 into oil space 40 of evaporator 38, while the vapor space 41 of the latter is in communication with the vacuum space of casing 11 through pipe 43 and opening 37. Falling through the perforations of plate 39, the oil is broken up into a fine spray, which gives up its gaseous content while exposed to the vacuum within vapor space 41, after which it reaches the tail pipe 44. The liberated gas or vapor passes into gas pipe 22 through pipe 43 and opening 37, the particles of fluent material which might be carried in suspension being either deflected by baffle plate 36, which acts as a separator when used or separated from the gas or vapor by external means, similar to separator 50ª in Fig. 4.

Tail pipe 44 empties into a receptacle 45 which remains filled to its overflow whether tank 16 is filling or emptying, thereby always sealing the end of tail pipe 44 against the atmosphere.

The oil which is thus freed under a partial vacuum of most of the more volatile fluids, will be of a more stable character when returned to the oil tank 16 at atmospheric pressure, particularly if warmed up by the hot exhaust gases of the pumping engine passing through jacket 46, shown in dotted lines in Figs. 1 and 2. A further loss by evaporation is therefore effectively prevented, and the valuable volatile fluids are recovered at the trifling expense of pumping against an increased head equal to the friction in pipe 42 and the difference in height between the levels of the oil in tail pipe 44 and oil space 40.

The operation of a flowing well as shown in Fig. 3 is substantially the same as just described, with the difference that vapor pipe 43 is directly connected with valve 35 of gas pipe 22, instead of connecting to casing 11, which in such case may be filled with oil, and gas pipe 22 leads either to an independent vacuum pump or to the pipe system of pumping gas wells, as shown by Fig. 1.

The recovery of the gas or vapor escaping through the safety valves 29 of storage tanks 26, Figs. 1 and 4, is accomplished by connecting the outlets of valves 29 to the main gas pipe 22 by a pipe 49, and adjusting the valves 29 to the maximum pressure desired on tanks 26, so that any gas or vapor of a pressure higher than the desired one, passes through valves 29 into the vacuum system to be compressed and utilized as desired, instead of being wasted as heretofore. Tanks 26 in Fig. 1 contain the volatile liquid from the condensers at high pressure, whereas tanks 26 of Fig. 4 represent storage tanks at refilling stations, in which the volatile liquids released of the high pressure are stored prior to being transferred into shipping barrels or tank cars.

My invention is equally well adapted for the recovery of volatile fluids which contain air or other gases undesirable to be mixed with natural gas, and are therefore unsuitable for being passed directly into main gas pipes 22 for saturating the gas therein, or the invention may be used for the recovery of the volatile fluids absorbed in a menstruum, the operation of which cases I will now describe. In Fig. 4, pipe 68 is extended by a pipe 68ª, to which is connected a separator 50ª and a barometric evaporator 50. At the junction of pipes 68 and 69 is placed a branch with stop valve 67ª, to which is connected a jet absorber 61.

A tank 51 containing absorbent, such as kerosene, naphtha and the like, into which tail pipe 59 is immersed, is provided with a vent 52, liquid distributor 65 and drain valve 74. A circulating pump 53 is connected to tank 51 by a suction pipe 54 and to evaporator 50 by a discharge pipe 55. A pressure pump 62 is connected to tank 51 by suction pipe 63 and to jet absorber 61 by a discharge pipe 64, pipe 66 connecting distributor 65 with the outlet of jet absorber 61. The operation of the combination is as follows:

Evaporator 50 being placed at such an elevation that a column of saturated absorbent of the height $-h-$ equals in pressure the vacuum carried within pipes 22 and 49, and tank 51 is assumed to be filled with absorbent liquid, while valve 67 is closed, valve 67ª open and pumps 53 and 62 are operating.

The absorbent enters pump 62 through pipe 63 to be put under pressure and discharged into absorber 61 in jets of great velocity. These jets create a strong suction, whereby the gas or vapor set free in barrels 73 or in any other vessel containing a volatile liquid in the presence of air or other gases is aspirated through pipe 69 into absorber 61, in which they are absorbed, put under pressure and delivered into tank 51 by said jets of absorbent. The latter deliver likewise into tank 51 the air and non-condensable gases which may be carried into absorber 61, but instead of being compressed with the gas or vapor as in the recovery by mechanical means, they bubble through the absorbent and leave tank 51 through vent 52, to be either utilized as fuel in furnaces or internal combustion engines, or wasted to the atmosphere.

The more or less saturated absorbent in tank 51 is continuously circulated by pump 53 through evaporator 50, (shown in section by Figs. 5 and 6, the arrow in pipe 68ª indicating its use as absorber, whereas pipe 68ª is the vapor outlet when used as evaporator,) which is divided into a liquid space 57 and a vapor space 58 by a nozzle plate 56, provided with a number of nozzles 60. Space 58 is subjected to the vacuum in pipes 22 and 49, which causes the saturated absorbent, pumped under pressure into liquid space 57, to pass through nozzles 60 with a great velocity, whereby it is broken up into a fine spray and its content of gas or vapor quickly evaporated while falling into tail pipe 59 and back into tank 51, substantially free from gas or vapor, to be used over and over again.

The gas or vapor liberated from the absorbent is aspirated from space 58 through pipes 68ª and 49, then mixed within the latter with the gas or vapor escaping from the valves 29, and the mixture disposed of through pipe 22 by the action of vacuum pump 21 as described before. The separator 50ª intercepts any liquid particles which might be carried over from evaporator 50, and returns same through pipe 59ª into tail pipe 59 by gravity.

The combination just described may be employed wherever a gas pumping system exists, or the gas or vapor recovered can be profitably disposed of by independent vacuum pumps and compressors.

But where such opportunities do not exist, as for instance near railroad stations, in city stores, warehouses and the like, the recovery of volatile fluids can be accomplished by absorption alone, for which Fig. 4 represents a typical arrangement after the vertical pipe 49 and separator 50ª with tail pipe 59ª are eliminated.

Figure 5:
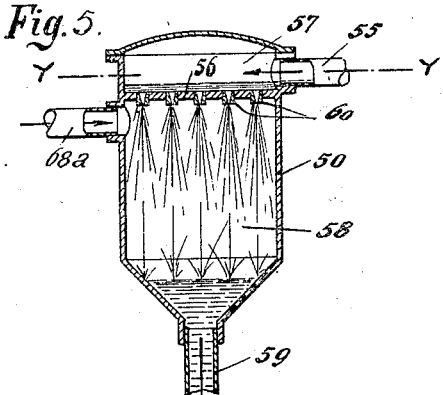
Fig. 5 is an enlarged section through the barometric evaporator of Fig. 4, arranged for being used as a barometric absorber.
Figure 6:
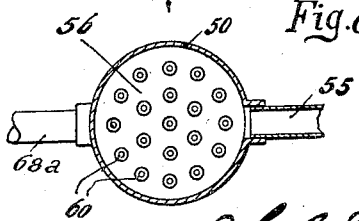
Fig. 6 is a sectional plan view along line y—y of Fig. 5.

In such cases the evaporator 50 is now an absorber, as shown by Figs. 5 and 6 in section and by arrow and the entire system may be operated either with absorber 50 and pump 53, or with jet absorber 61 and pump 62, each set independent of the other or both sets together as one unit, depending entirely upon the character of the fluid to be recovered and the product to be disposed of. With valve 67 open to permit the gas or vapor from storage tanks 26 to enter absorber 61 through pipe 69, the system is operated by jet absorber 61 as described before.

When the absorbent in tank 51 is sufficiently saturated with volatile fluid recovered, tank 51 is emptied through valve 74 and refilled with a fresh charge of absorbent. The saturated absorbent may be disposed of in the well known manner by distillation, for the separation of absorbent from volatile fluid, or it may be used as a commercial article, being a valuable fuel regardless of the absorbent used.

The barometric absorber 50 with pump 53 operates exactly as described for evaporator 50, the only difference being the much smaller height $-h-$ required, as a vacuum of a few inches of mercury and even atmospheric pressure is suitable for absorbing gas or vapor. The velocity required for producing a fine spray within space 58 results from the liquid pumped under pressure into space 57.

Closing valve 67ª and opening valve 67, places the entire system under the operation of barometric absorber 50 and pump 53, which circulates the absorbent under pressure, and the spray produced absorbs the gas or vapor entering vapor space 58 through pipes 69, 68, 49 and 68ª. Closing valve 67 and opening valve 67ª places the filling system under the operation of jet absorber 61 and pump 62, while the storage tanks 26 are operated by barometric absorber 50 and pump 53. The saturated absorbent is disposed of in either case as described before.

The recovery of volatile fluids from liquids containing the same, whether by nature as in the case of crude oil, or artificially mixed as by the use of an absorbing menstruum, is according to my invention exactly the same, and consists simply in subjecting the liquid to a partial vacuum, either with or without the application of heat, exclusive of any other active medium, such as steam, air or compressed gas as fluid carriers, than the liquid itself.

The principles employed in Figs. 1, 2 and 4 are the same, the well pump in Figs. 1 and 2 is identical with pump 53 in Fig. 4; the deflecting means 36 in Fig. 2 and the separator 50ª in Fig. 4 are for the same purpose, and the action of the principal part of the invention, the evaporators 38 and 50 in their barometric relation to the liquid delivery, is in Figs. 1, 2, 3 and 4 exactly the same, the absorption feature shown by Fig. 4 illustrates besides the application of the improved process to different sources of liquids containing volatile fluids. The gas to be saturated with the recovered fluids never comes in contact with the liquid containing the fluids; and no active medium as a fluid carrier being employed in my invention no device for recovering such fluid carrier as used in the prior art is required. However, I do not limit myself to the arrangements disclosed nor to the exact procedures described for either the intermittent or continuous operation, but include as my invention any other arrangement in which the features described are employed in any form.

Having thus described my invention, it must be understood that various modifications, changes, substitutions, additions and omissions, in the methods described and may be made within the scope of the claim, without in the least departing from the spirit of my invention. For instance, the baffle plate 36 may be omitted in all cases, in which an intermittent operation is not desired and the vapor pipe 43 direct connected to pipe system 22, as shown by Fig. 3. Or tank 45 may be omitted entirely or placed on the outside of tank 16 and simply connected with the latter by an overflow pipe. The essential features are in all cases the subjecting of the oil issuing from a well, before same is exposed to the atmosphere and discharged into storage tank 16, to the partial vacuum communicated to the well casing from a distantly located central or individual pumping station for the delivery of the more volatile fluids from the wells to a distantly located compression or absorption station, and returning the oil substantially freed from the more volatile substances by gravity and without the aid of mechanical means from said partial vacuum to the ordinary storage tank at atmospheric pressure.

What I claim as new and desire to secure by Letters Patent is:

The method of recovering volatile fluids from liquids containing the same, which consists in simultaneously heating said liquid and raising it to a barometric elevation, in subjecting the heated liquid to the partial vacuum maintained in a gas pumping system, in gravitating said liquid from said elevation into the atmosphere and in saturating the gas in said system with the fluids so liberated.

In testimony whereof, I have hereunto subscribed my name this 20th day of October, 1917.

JOHN C. BERTSCH.